(12) United States Patent
Walters (10) Patent No.: US 8,634,217 B2
(45) Date of Patent: Jan. 21, 2014

(54) SYSTEM AND METHOD FOR CONVERTING AN AC INPUT VOLTAGE TO A REGULATED DC OUTPUT VOLTAGE USING A Z-TYPE CONVERTER WITH RECTIFIED SWITCHES

(75) Inventor: Michael M. Walters, Apex, NC (US)

(73) Assignee: Intersil Americas Inc., Milpitas, CA (US)

( * ) Notice: Subject to any disclaimer, the term of this patent is extended or adjusted under 35 U.S.C. 154(b) by 445 days.

(21) Appl. No.: 13/107,438

(22) Filed: May 13, 2011

(65) Prior Publication Data

US 2012/0081936 A1 Apr. 5, 2012

Related U.S. Application Data

(60) Provisional application No. 61/388,334, filed on Sep. 30, 2010.

(51) Int. Cl.
*H02M 7/217* (2006.01)

(52) U.S. Cl.
USPC .................. 363/81; 363/89; 363/127

(58) Field of Classification Search
USPC .................. 363/80, 81, 84, 89, 127
See application file for complete search history.

(56) References Cited

U.S. PATENT DOCUMENTS

| 2010/0085787 | A1 | 4/2010 | Kane et al. | |
|---|---|---|---|---|
| 2012/0081081 | A1* | 4/2012 | Walters | 320/163 |
| 2012/0081936 | A1* | 4/2012 | Walters | 363/80 |

OTHER PUBLICATIONS

Cao, Dong et al. "A Family of Z-source and Quasi-Z-source DC-DC Converters." The Department of ECE at Michigan State University, 2120 Engineering Building, East Lansing, MI 48824. pp. 1097-1101. 2009.

Sabzali, Ahmad J. et al. "A New Bridgeless PFC Sepic and Cuk Rectifiers with Low Conduction and Switching Losses." Department of Electrical Engineering, College of Technological Studies, P.O. Box 35007, Al-Shaa'b, Kuwait, 36051. pp. 550-556. 2009.

Tipirneni, N. et al. "AlGaN/GaN Bidirectional Power Switch." University of South Carolina, Dept of Electrical Engineering, 301 Main St., Columbia, SC. pp. 97-98. Downloaded on Nov. 16, 2009 from IEEE Xplore.

(Continued)

*Primary Examiner* — Jeffrey Sterrett
(74) *Attorney, Agent, or Firm* — Gary Stanford (57) ABSTRACT

An AC to DC converter for converting an AC input voltage to a regulated DC output voltage using a Z-type converter and rectified switches. The Z-type converter includes first and second inductors, a capacitor, two rectified switches and a load device coupled in a cross-coupled configuration. The Z-type converter may be configured according to a Z-source or a quasi-Z-source rectifier network. The AC input voltage is applied to an input and the DC output voltage is developed across the load device. Each rectified switch may be configured as a series-coupled diode and electronic switch or as a dual gate GaN device with a shorted gate. A control network monitors the DC output voltage and develops a control signal for controlling the first and second rectified switches to regulate the DC output voltage. The control network may control the rectified switches based on duty cycle control or current mode control.

22 Claims, 7 Drawing Sheets

(56) References Cited

OTHER PUBLICATIONS

Morita, Tatsuo et al. "650V 3.1mΩcm$^2$ GaN-based Monolithic Bidirectional Switch Using Normally-off Gate Injection Transistor." Semiconductor Device Research Center, Semiconductor Company, Matsushita Electric—Panasonic, 1 Kotari-yakemachi, Nagaokakyoshi, Kyoto 617-8520, Japan. 2007. pp. 865-868.

Xie, Yeyuan et al. "A Novel Buck-Boost Z-Source Rectifier." Zhejiang University, Hangzhou, China, 310027. pp. 1-5.

Zhou, Dongyan et al. "Synthesis of PWM Dc-Dc Power Converters." California Institute of Technology, Pasadena, CA 1996. pp. 1-199.

Gu, Bin et al. "Z-Source Adjustable Speed Drive Systems and its Space-vector Pulse Width Modulation Strategy." *Electric Drive*, vol. 5 Oct. 20, 2005 pp. 1-4.

Yu, Tang et al. "Single-Phase Four Switch Z-Source AC-AC Converters." *Journal of Nanjing University of Aeronautics & Astronautics*. Vol 39 No. 5, Oct. 15, 2007. pp.1-6.

Pan, Jian et al. "Research on Z-Source Grid-connected Photovoltaic Inverter." *Modern Electronics Technique* vol. 12 Jun. 15, 2008. pp. 1-4.

\* cited by examiner

SYSTEM AND METHOD FOR CONVERTING AN AC INPUT VOLTAGE TO A REGULATED DC OUTPUT VOLTAGE USING A Z-TYPE CONVERTER WITH RECTIFIED SWITCHES

CROSS-REFERENCE TO RELATED APPLICATIONS

This application claims the benefit of U.S. Provisional Application Ser. No. 61/388,334, filed on Sep. 30, 2010, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

The benefits, features, and advantages of the present invention will become better understood with regard to the following description, and accompanying drawings The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Disclosed herein is a method to regulate a DC output voltage given an AC input voltage. A system according to an embodiment of the present invention provides direct AC to DC power conversion using a single conversion stage with high switching frequency and regulation. A system according to an embodiment of the present invention enables light-emitting diode (LED) light bulb replacement. A system according to an embodiment of the present invention may exploit the use of Gallium Nitride (GaN) characteristics as the power switch. A system according to an embodiment of the present invention eliminates a bridge rectifier which is common in typical AC to regulated DC converters. A system according to an embodiment of the present invention uses duty cycle control to achieve both load regulation and AC rectification. A system according to an embodiment of the present invention uses a Z-type rectifier network, such as a Z-source rectifier network or a quasi-Z-source rectifier network. The Z-type rectifier network is controlled or switched using a 'rectified switch'. In one embodiment, a dual gate GaN device with a shorted gate is used as the rectified switch for switching the Z-type rectifier network. In another embodiment, a series-coupled diode and electronic switch are collectively used as the rectified switch for switching the Z-type rectifier network. In embodiments described herein, the electronic switch for each rectified switch is illustrated as an N-channel metal-oxide semiconductor, field-effect transistor (MOSFET). It is appreciated, however, that alternative types of electronic switches may be used, such as, for example, other types of FET devices (e.g., P-channel MOSFETs, NFETs, PFETs, etc.), and other types of transistors, such as bipolar transistors (e.g., bipolar junction transistors, insulated-gate bipolar transistors, etc.). A system according to an embodiment of the present invention uses common inductors and avoids custom transformers.

A DC output voltage is converted from an AC input voltage using a Z-type converter, such as either a Z-source converter or a quasi-Z-source converter. For either converter, the duty cycle (D) is controlled to regulate the DC output as the AC input VAC sweeps both positive and negative. In one embodiment the output voltage V0 is regulated. In an alternative embodiment, the output current is regulated. As used herein, VAC represents any type of AC input voltage of any suitable frequency and/or magnitude, such as AC line input voltage, half-bridge rectified AC voltage, full-bridge rectified AC voltage, etc. Embodiments of the present invention are illustrated for single-phase systems, but may easily be extended to poly-phase configurations. For example, a load may be referenced to the neutral of a Y-connected poly-phase system to economize on the added elements. A Z-source or quasi-Z-source converter as described herein may be used for rotor field controls of an AC synchronous motor or generator or the like.

Figure 1A:
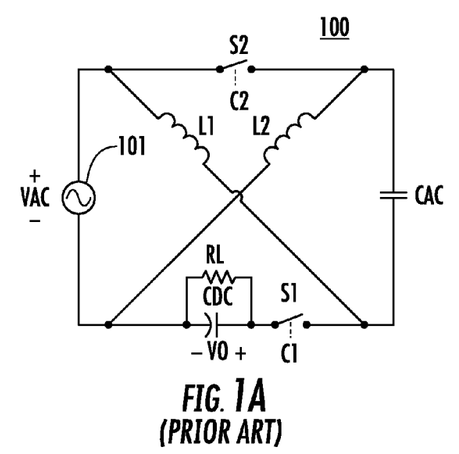
FIG. 1A is a schematic diagram of a conventional Z-source rectifier network.

FIG. 1A is a schematic diagram of a conventional Z-source rectifier network 100. An AC voltage source 101 has a positive terminal coupled to one end of an inductor L1 and to one terminal of a single-pole, single-throw (SPST) switch S2. The other terminal of the switch S2 is coupled to one end of a second inductor L2 and to one end of a capacitor CAC. The other end of CAC is coupled to the other end of L1 and to one terminal of another SPST switch S1. The other terminal of the switch S1 is coupled to one end of a load resistor RL and to one end of a capacitor CDC, in which RL and CDC are coupled in parallel. The other ends of RL and CDC are coupled to the other end of L2 and to the negative terminal of the AC voltage source 101. The AC voltage source 101 develops an AC voltage VAC. The switches S1 and S2 of the Z-source rectifier network 100 are switched as controlled by signals C1 and C2, respectfully. The AC input is VAC and the DC output voltage V0 is the voltage across the load including the load resistance RL in parallel with the capacitor CDC. The switching frequency of each of the switches S1 and S2 is generally higher than the frequency of VAC.

Switches S1 and S2 alternately conduct so that when switch S1 in 'on', switch S2 is 'off' (C1 is a logic level 1 and C2 is a logic level 0). Similarly switch S1 is 'off' when switch S2 is 'on' (C1 is a logic level 0 and C2 is a logic level 1). The duty cycle (D) is the ratio of the time C1 is HIGH (logic level 1) to the total switching period. Thus, C1 is switched based on duty cycle D and C2 is switched based on 1-D.

Figure 1B:
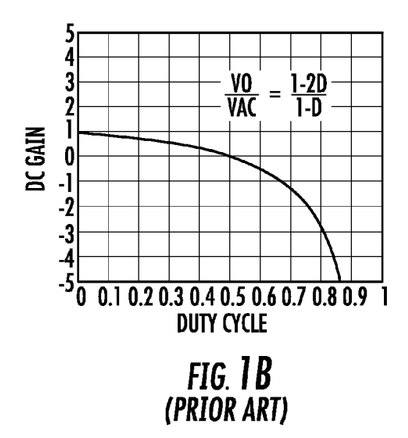
FIG. 1B is a graphic diagram plotting the corresponding DC voltage gain of the Z-source rectifier network of FIG. 1A as a function of the duty cycle.

FIG. 1B is a graphic diagram plotting the corresponding DC voltage gain of the Z-source rectifier network 100 as a function of the duty cycle D. The voltage gain is the DC output voltage V0 divided by the AC input voltage, or VO/VAC, in which VO/VAC=(1−2D)/(1−D). A control loop may be used to regulate a positive output voltage for either a positive or negative input voltage. The DC output, therefore, may be regulated by controlling the duty cycle as the AC sinusoidal wave form sweeps both positive and negative.

Figure 2A:
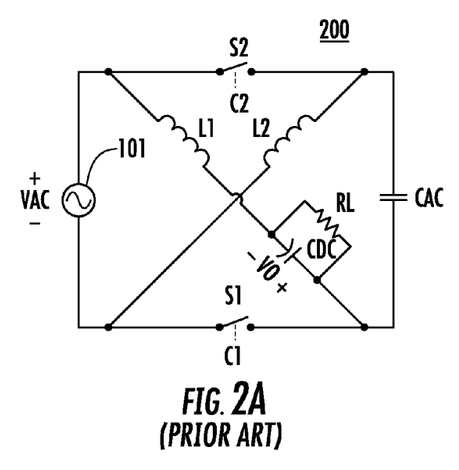
FIG. 2A is a schematic diagram of a conventional quasi-Z-source rectifier network and FIG. 2B is a graphic diagram plotting the corresponding DC voltage gain of the quasi-Z-source rectifier network of FIG. 2A as a function of the duty cycle.

FIG. 2A is a schematic diagram of a conventional quasi-Z-source rectifier network 200. The quasi-Z-source rectifier network 200 is similar to the Z-source rectifier network 100 in which similar components assume the same reference numerals. The AC voltage source 101 has a positive terminal coupled to one end of L1 and to one terminal of switch S2. The other terminal of the switch S2 is coupled to one end of L2 and to one end of a capacitor CAC. The other end of CAC is coupled to one terminal of S1 and to one end of each of RL and CDC coupled in parallel. The other ends of RL and CDC are coupled to the other end of L1. The other terminal of the switch S1 is coupled to the other end of L2 and to the negative terminal of the AC voltage source 101. The AC voltage source 101 develops VAC.

Switches S1 and S2 of the quasi-Z-source rectifier network 200 are switched as controlled by C1 and C2, respectfully. Again, the AC input is the voltage source VAC and the DC output voltage is across the load RL in parallel with CDC. Switches S1 and S2 alternately conduct so that when switch S1 in 'on' switch S2 is 'off' (e.g., C1 is a logic level 1 and C2 is a logic level 0). Similarly switch S1 is 'off' when switch S2 is 'on' (e.g., C1 is a logic level 0 and C2 is a logic level 1). Again, the duty cycle D is the ratio of time C1 is HIGH (e.g., logic level 1) to the total switching period, and C1 is switched based on duty cycle D and C2 is switched based on 1-D.

Figure 2B:
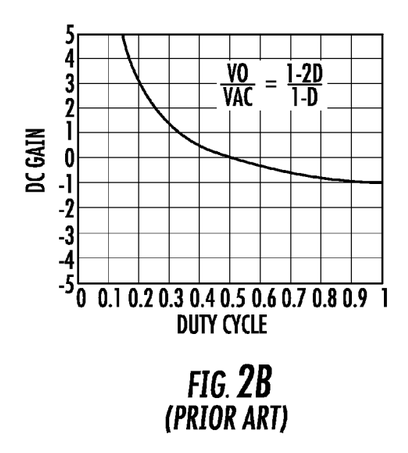

FIG. 2B is a graphic diagram plotting the corresponding DC voltage gain of the quasi-Z-source rectifier network 200 as a function of the duty cycle D. The voltage gain is the DC output voltage V0 divided by the input voltage VAC, in which VO/VAC=(1−2D)/(D). A control loop may be used to regulate a positive output voltage for either a positive or negative input voltage. The DC output, therefore, may be regulated by controlling the duty cycle as the AC sinusoidal wave form sweeps both positive and negative.

The following systems and methods apply equally to either type of Z-type rectifier network, including the Z-source rectifier network or the quasi-Z-source rectifier network. In various embodiments, each of the switches S1 and S2 is replaced by a rectified switch. In one embodiment, each of the switches S1 and S2 is replaced by a diode in series with a MOSFET (metal-oxide semiconductor, field-effect transistor) or the like. In another embodiment, each of the switches S1 and S2 is replaced by a dual gate GaN device with a shorted gate. Both approaches using a rectified switch feature a single stage AC-to-DC power conversion and avoid a bridge rectifier which is typical of two-stage AC-to-DC conversion methods.

Figure 3:
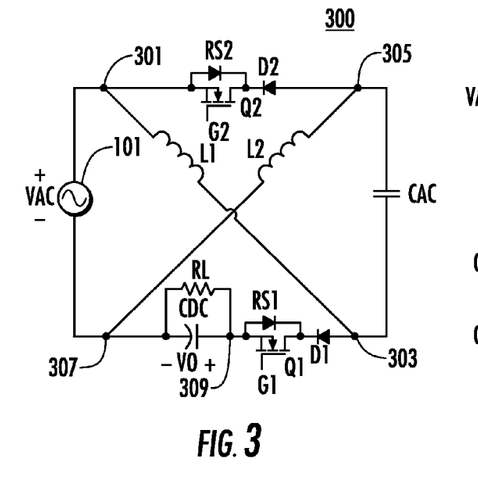
FIG. 3 is a schematic diagram of a Z-source converter implemented according to one embodiment of the present invention.

FIG. 3 is a schematic diagram of a Z-source converter 300 implemented according to one embodiment of the present invention. The Z-source converter 300 includes the AC voltage source 101, the inductors L1 and L2, the capacitor CAC and the load RL and CDC coupled in similar manner as the Z-source rectifier network 100. The inductor L1 is coupled between nodes 301 and 303 and the inductor L2 is coupled between nodes 305 and 307. The AC voltage source 101 has its positive terminal coupled to node 301 and its negative terminal coupled to node 307. The capacitor CAC is coupled between nodes 303 and 305. The switches S1 and S2 are replaced by a rectified switches RS1 and RS2, respectively, in which each rectified switch includes a series-coupled diode and electronic switch, shown as an N-channel MOSFET. As previously described, other types of electronic switches may be used (e.g. other types of MOS or FET devices, other types of transistors such as BJTs and the like, etc.). For the rectified switch RS1, a diode D1 has its anode coupled to node 303 and has its cathode coupled to the drain of an N-channel MOSFET Q1. The source of Q1 is coupled to a node 309. RL and CDC are coupled in parallel between nodes 307 and 309. The diode D1 and MOSFET Q1 are thus coupled in series to form the first rectified switch RS1. For the rectified switch RS2, a diode D2 has its anode coupled to node 305 and has its cathode coupled to the drain of an N-channel MOSFET Q2. The source of Q2 is coupled to node 301. The diode D2 and MOSFET Q2 are thus coupled in series to form the second rectified switch RS2. The MOSFETs Q1 and Q2 are controlled by gate signals G1 and G2, respectively. The AC input is the voltage VAC developed by the AC voltage source 101 applied to nodes 301 and 307 and the DC output voltage is VO across RL between nodes 309 and 307.

In one embodiment, the G1 and G2 control signals are toggled to opposite polarities with respect to each other, but further based on the polarity of VAC. A control network senses the polarity of VAC and either the output voltage V0 or the current through the inductors L1 and L2 for developing the control signals G1 and G2. In one embodiment, for example, a control network 801 (FIG. 8) may be used to perform a control scheme. As further described below, when VAC is positive, G2 is toggled coincident with the PWM signal and G1 is toggled coincident with an inverted version of the PWM signal. When VAC is negative, G1 is toggled coincident with the PWM signal and G2 is toggled coincident with an inverted version of the PWM signal. Operation repeats in this manner during operation. The switching frequency of G1 and G2 (and thus of the rectified switches RS1 and RS2) is generally higher than the frequency of VAC.

Figure 4:
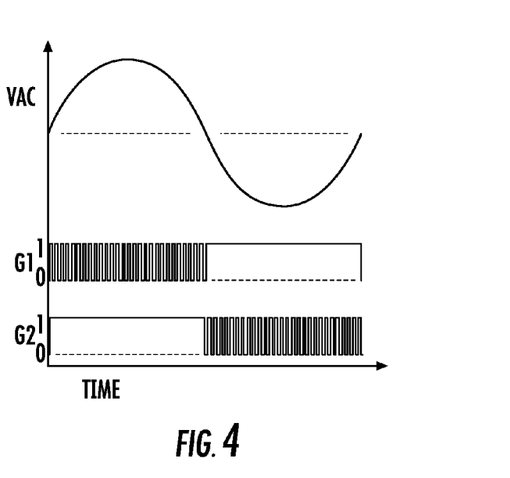
FIG. 4 is a timing diagram illustrating another control method for generating G1 and G2 for controlling switching of the Z-source converter of FIG. 3.

FIG. 4 is a timing diagram illustrating another control method for generating G1 and G2 for controlling switching of the Z-source converter 300. VAC is plotted along with G1 and G2 versus time. During the positive half cycle of the input line voltage VAC, G2 is held HIGH and G1 is modulated (e.g., based on PWM signal or the like based on monitoring of VO or load current) to control the load voltage (across RL) or the load current (through RL or one or both inductors). During the negative half cycle of the input voltage VAC, G1 is held HIGH and G2 is modulated to control the load voltage or current. The modulation is shown in simplified form where it is understood that the duty cycle of the modulated signal is controlled according to the control function (output voltage or load current or the like). A control network 601, described further below, operates according to the control scheme illustrated in FIG. 4.

Figure 5A:
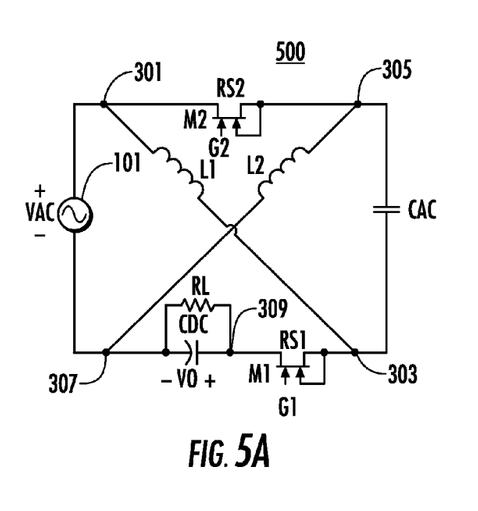
FIG. 5A is a schematic diagram illustrating a Z-source converter according to another embodiment of the present invention.

FIG. 5A is a schematic diagram illustrating a Z-source converter 500 according to another embodiment of the present invention. The Z-source converter 500 is similar to the Z-source converter 300 in which similar components assume the same reference numerals, including the AC voltage source 101, the inductors L1 and L2, the capacitor CAC and the load devices RL and CDC coupled together in substantially the same manner relative to nodes 301, 303, 305, 307 and 309. In this case the rectified switches RS1 and RS2 are dual gate GaN devices, each having one of its gates shorted to one of its current terminals, which configuration is referred herein to as a 'shorted gate'. In particular, the diode D1 and MOSFET Q1 are replaced by a GaN device M1 having current terminals coupled between nodes 303 and 309 and having one shorted gate also coupled to node 303. Also, the diode D2 and MOSFET Q2 are replaced by a GaN device M2 having current terminals coupled between nodes 301 and 305 and having one shorted gate also coupled to node 305. The other gate of M1 receives the control signal G1 and the other gate of M2 receives the control signal G2.

Again, the AC input is the voltage source VAC and the DC output voltage V0 is across the load resistor RL. In one embodiment, G1 and G2 may have the same form as control signals C1 and C2. In another embodiment, the control method illustrated in FIG. 4 may be used for generating G1 and G1 for controlling switching of the Z-source converter 500. Thus, similar operation is realized with dual gate GaN devices M1 and M2 as with the MOSFETs Q1 and Q2 with the series-coupled diodes D1 and D2 as the rectified switches RS1 and RS2, respectively.

Figure 5B:
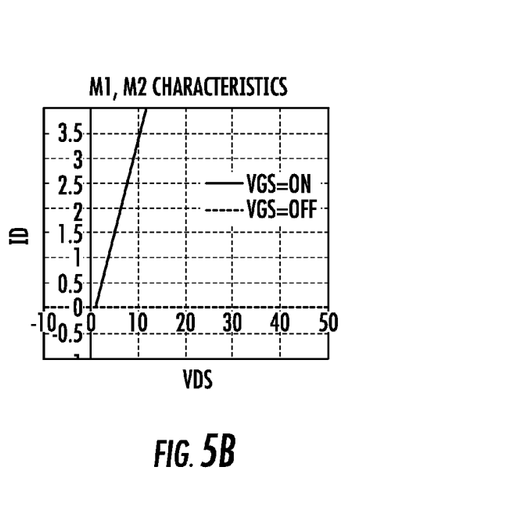
FIG. 5B is a graphic diagram illustrating the static characteristics of the dual gate GaN devices M1 and M2 with shorted gates of FIG. 5A.

FIG. 5B is a graphic diagram illustrating the static characteristics of the dual gate GaN devices M1 and M2 with shorted gates. In particular, the current through the current terminals ID is plotted versus the voltage across the current terminals VDS for both ON (VGS=ON) and OFF (VGS=OFF) conditions. The second gate controls forward conduction and blocking, whereas the device blocks reverse current. These characteristics are similar to the characteristics of the series-coupled diode and MOSFET. Therefore the converter operation with the dual gate GaN devices with shorted gate is also similar to that shown in FIG. 4.

Although FIGS. 3 and 5A both illustrate a Z-source converter configuration including a Z-source rectifier, a similar quasi-Z-source converter configuration may be implemented including a quasi-Z-source rectifier instead. Thus, either the series-coupled diode and MOSFET or the dual gate GaN device with shorted gate replaces the switches S1 and S2 of the quasi-Z-source rectifier network 200 to achieve similar results. The gate control signals G1 and G2 may be controlled as shown in FIG. 4.

Figure 6:
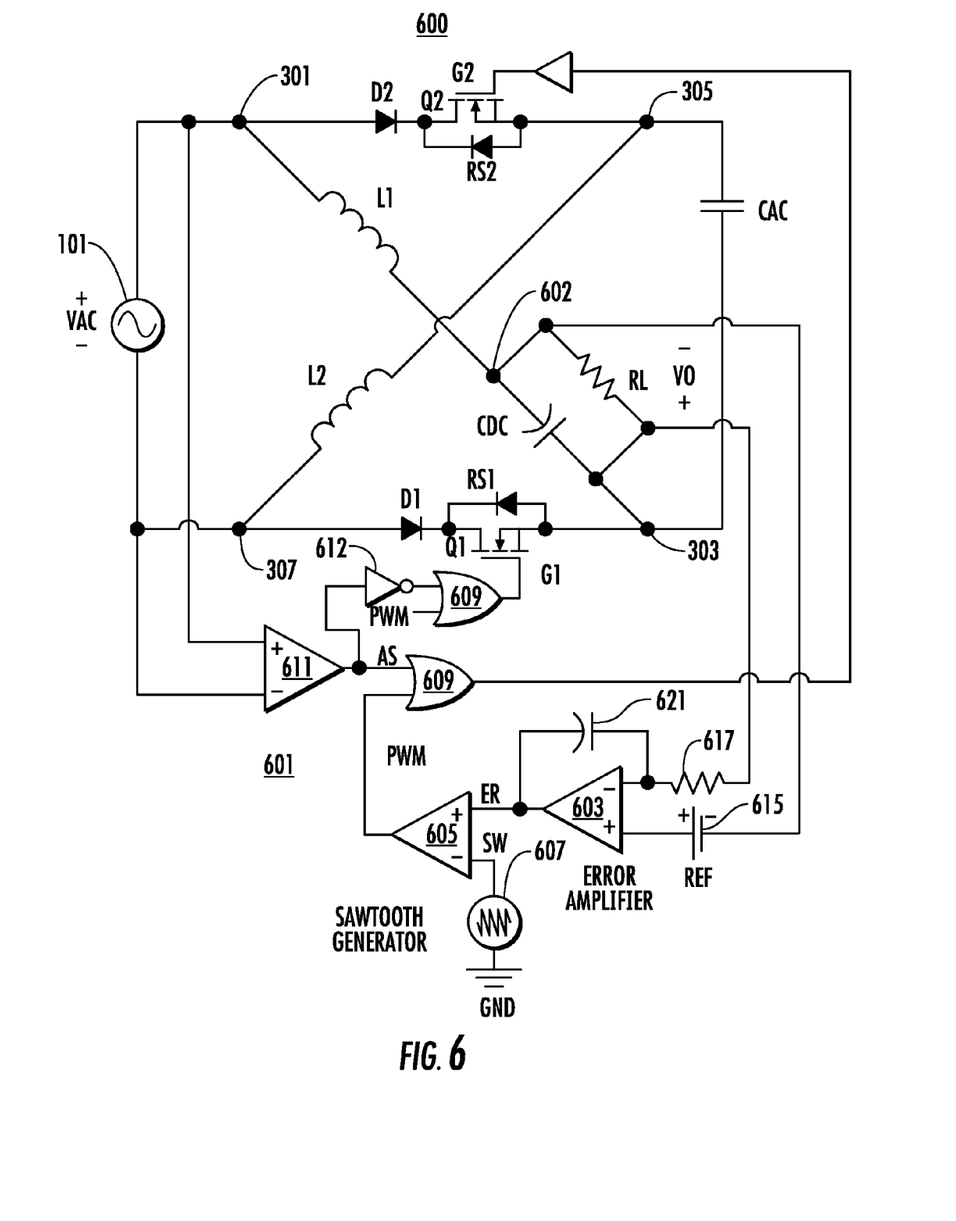
FIG. 6 is a schematic diagram of a quasi-Z-source converter according to another embodiment of the present invention.

FIG. 6 is a schematic diagram of a quasi-Z-source converter 600 according to another embodiment of the present invention, which includes a quasi-Z-source rectifier network similar to that shown in FIG. 2A, except modified by replacing the switches S1 and S2 with rectified switches for the switching function. The quasi-Z-source converter 600 is similar in form to the Z-source converter 300 in which similar components assume the same reference numerals, including the AC voltage source 101, the inductors L1 and L2, the capacitor CAC coupled together in substantially similar manner relative to nodes 301, 303, 305 and 307. In this case, however, the load devices RL and CDC are coupled in parallel with each other and collectively coupled in series with L1 between nodes 301 and 303. As shown, L1 is coupled between node 301 and an intermediate node 602 and RL and CDC are coupled in parallel between nodes 602 and 303. The rectified switch RS1 is coupled between nodes 307 and 303, including a diode D1 and a MOSFET Q1. The diode D1 has its anode coupled to node 307 and its cathode coupled to the drain of Q1. The source of Q1 is coupled to node 303. The rectified switch RS2 is coupled between nodes 301 and 305, including a diode D2 and a MOSFET Q2. The diode D2 has its anode coupled to node 301 and its cathode coupled to the drain of Q2. The source of Q2 is coupled to node 305. The AC input is the AC voltage source 101 providing VAC across nodes 301 and 307 and the DC output voltage V0 is across RL between nodes 303 and 602.

Furthermore, a control network 601 is provided for generating the control signals G1 and G2 for controlling the switches in similar manner as shown in FIG. 4. The control network 601 performs duty cycle control that inverts the loop to linearize the loop gain for both positive and negative input voltage. In this case, the output voltage V0 across RL is monitored and compared with a reference voltage REF by an error amplifier 603 configured as an integrator. As shown, one end of RL is coupled to one end of a resistor 617 having its other end coupled to one end of a capacitor 621 and to an inverting input of the error amplifier 603. The other end of RL is provided to a negative terminal of a voltage source 615 developing the reference voltage REF, in which the voltage source 615 has its positive terminal coupled to the non-inverting input of the error amplifier 603. The other end of the capacitor 621 is coupled to the output of the error amplifier 603 for developing an error voltage ER. ER is provided to the non-inverting input of a comparator 605, which has its inverting input receiving a sawtooth wave SW output from a sawtooth generator 607 referenced to ground (GND).

The output of the comparator 605 develops a PWM signal which is provided to one input of a 2-input OR gate 609 and to one input of another 2-input OR gate 613. An AC sense signal AS is provided to the other input of the OR gate 609. A comparator 611 has its non-inverting input coupled to the positive terminal of the voltage source 101 and has its inverting input coupled to the negative terminal of the voltage source 101. Thus, the comparator 611 senses VAC and develops the AS signal at its output. AS is inverted by an inverter 612 having its output coupled to the other input of the OR gate 613. The output of OR gate 609 is used to develop the control signal G2 for controlling rectified switch RS2 and the output of OR gate 613 is used to develop the control signal G1 for controlling rectified switch RS1.

In operation, any difference between the output voltage V0 and the reference voltage REF is integrated by error amplifier 603 to provide ER, which is compared by the comparator 605 with the sawtooth wave SW to develop PWM. When VAC is positive, AS is high keeping G2 high and PWM toggles G1. When VAC is negative, AS is low keeping G1 high while PWM toggles G2 in substantially similar manner as shown in FIG. 4.

The control network 601 may be used to control the quasi-Z-source converter 600 configured instead with the dual gate GaN devices with shorted gate as the rectified switches RS1 and RS2. Also, the control network 601 may be used to control either the Z-source converter 300 or the Z-source converter 500. The sawtooth wave SW is an exemplary embodiment of a ramp wave provided by any type of ramp generator.

Figure 7:
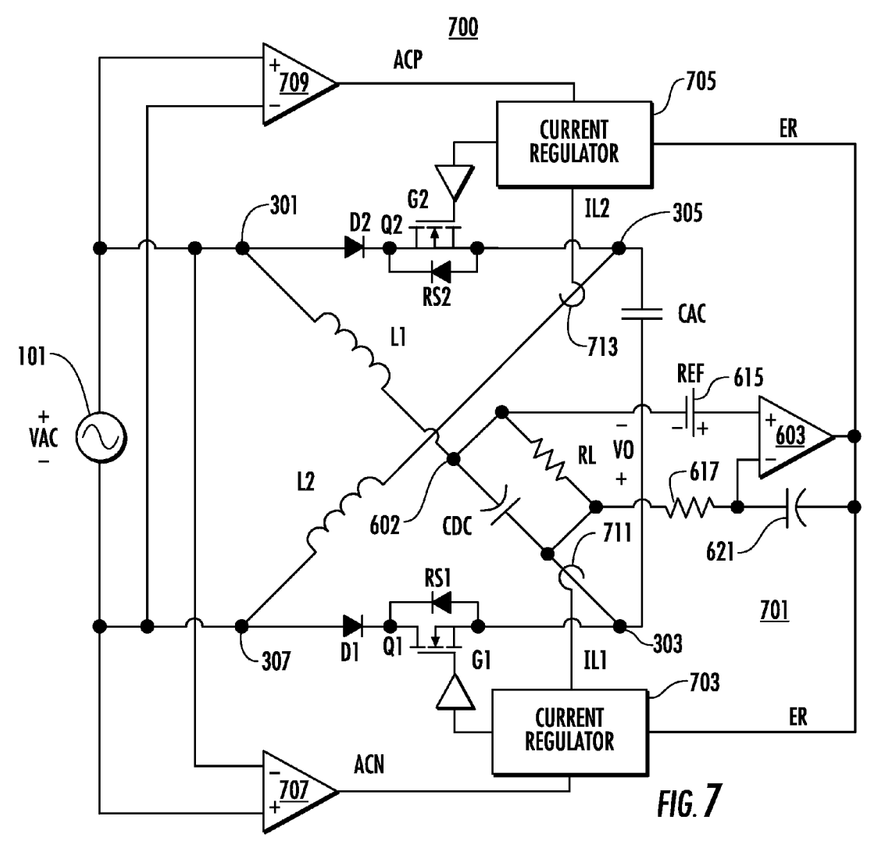
FIG. 7 is a schematic diagram of a quasi-Z-source converter according to another embodiment of the present invention.

FIG. 7 is a schematic diagram of a quasi-Z-source converter 700, which includes a quasi-Z-source rectifier network similar to that shown in FIG. 6. The AC voltage source 101, the inductors L1 and L2, the load devices RL and CDC and the capacitor CAC are provided in coupled in similar manner relative to nodes 301, 303, 305, 307 and 602 as for the quasi-Z-source converter 600. Also, the rectified switch RS1 is provided including diode D1 and MOSFET Q1 coupled in series between nodes 307 and 303 in similar manner. Further, the rectified switch RS2 is provided including diode D2 and MOSFET Q2 coupled in series between the nodes 301 and 305 in similar manner.

The control network 601 is replaced by a control network 701. The control network 701 includes the voltage source 615, the resistor 617 and the capacitor 621 coupled to RL in similar manner as the control network 601 for developing the error voltage ER. In this case, however, the control network 701 performs current mode control which provides an alternate method for the control loop. Again, the AC input is the voltage source 101 providing VAC and the DC output voltage is VO across RL. Just as for the quasi-Z-source converter 600, the error amplifier 603 is configured as an integrator is used to integrate the difference between the output voltage across RL and the reference voltage REF. In this case, the ER output of the error amplifier 603 is used as a current command signal, which is provided to independent current regulators 703 and 705 for developing control signals G1 and G2 for controlling the rectified switches RS1 and RS2, respectively.

The control network 701 further includes AC polarity comparators 707 and 709, each coupled to the AC voltage source 101 for providing AC polarity signals. The comparator 707 has its inverting and non-inverting inputs coupled to the positive and negative terminals, respectively, of the AC voltage source 101, and has an output providing a first AC polarity signal ACN to an input of the current regulator 703. The comparator 709 has its inverting and non-inverting inputs coupled to the negative and positive terminals, respectively, of the AC voltage source 101, and has an output providing a second AC polarity signal ACP to an input of the current regulator 705. A current sensor 711 monitors the current through the inductor L1 and provides a corresponding current sense signal IL1 to the current regulator 703, and another current sensor 713 monitors the current through the inductor L2 and provides a corresponding current sense signal IL2 to the current regulator 705.

In operation, when VAC is positive, ACP is HIGH and G2 remains HIGH for this half cycle (such as shown in FIG. 4). Also, while VAC is positive, the current regulator 703 monitors the current of inductor L1 via IL1 and develops a duty cycle DA on G1 to control current. In this case while VAC is positive, the diode D2 conducts with a duty cycle (1-DA). When VAC is negative, ACN is HIGH and G1 is HIGH for this half cycle (as shown in FIG. 4). Also, while VAC is negative, current regulator 705 for rectified switch RS2 monitors the current of inductor L2 via IL2 and develops a duty cycle DB on G2 to control current. In this case while VAC is negative, the diode D1 conducts with a duty cycle (1−DB). Various types of current-mode control schemes are contemplated, such as average current mode control, peak current mode control, etc.

The control network 701 may be used to control the quasi-Z-source converter 600 configured instead with the dual gate GaN devices with shorted gate as the rectified switches RS1 and RS2. Also, the control network 701 may be used to control either the Z-source converter 300 or the Z-source converter 500.

Figure 8:
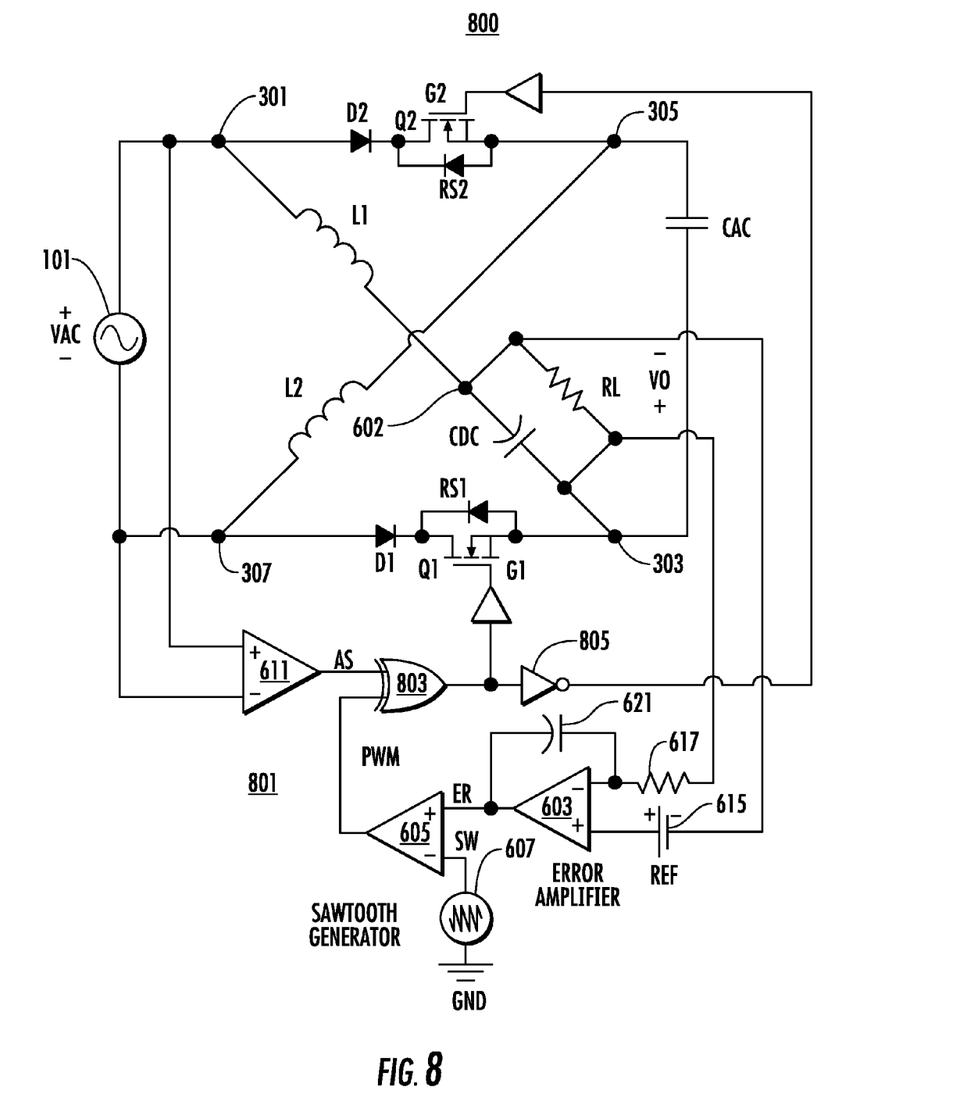
FIG. 8 is a schematic diagram of a quasi-Z-source converter according to another embodiment of the present invention.

FIG. 8 is a schematic diagram of a quasi-Z-source converter 800 according to another embodiment of the present invention, which is similar to the quasi-Z-source converter 600 except that the control network 601 is replaced by the control network 801. The AC voltage source 101, the inductors L1 and L2, the load devices RL and CDC, the rectified switches RS1 and RS2, and the capacitor CAC are provided in coupled in similar manner relative to nodes 301, 303, 305, 307 and 602 as for the quasi-Z-source converter 600. The control network 801 is substantially similar to the control network 601 and includes the error amplifier 603 (with supporting components 615, 617 and 621), the sawtooth generator 607 providing SW, and the comparators 605 and 611 configured to operate in substantially the same manner as previously described. In this case, the OR gates 609 and 613 and the inverter 612 are replaced by a 2-input exclusive-OR gate 803 and inverter 805. The AS signal at the output of comparator 611 is provided to one input and PWM is provided to the other input of the exclusive-OR gate 803, having its output buffered for developing G1 for controlling the rectified switch RS1. The output of the exclusive-OR gate 803 is inverted by inverter 805 and buffered for developing G2 for controlling the rectified switch RS2. In this case, when VAC is positive, the PWM signal is effectively routed to G2 and an inverted version of the PWM signal is routed to G1. When VAC is negative, the PWM signal is effectively routed to G1 and the inverted version of the PWM signal is routed to G1. The resulting loop gain is substantially the same for both half cycles of VAC.

Figure 9:
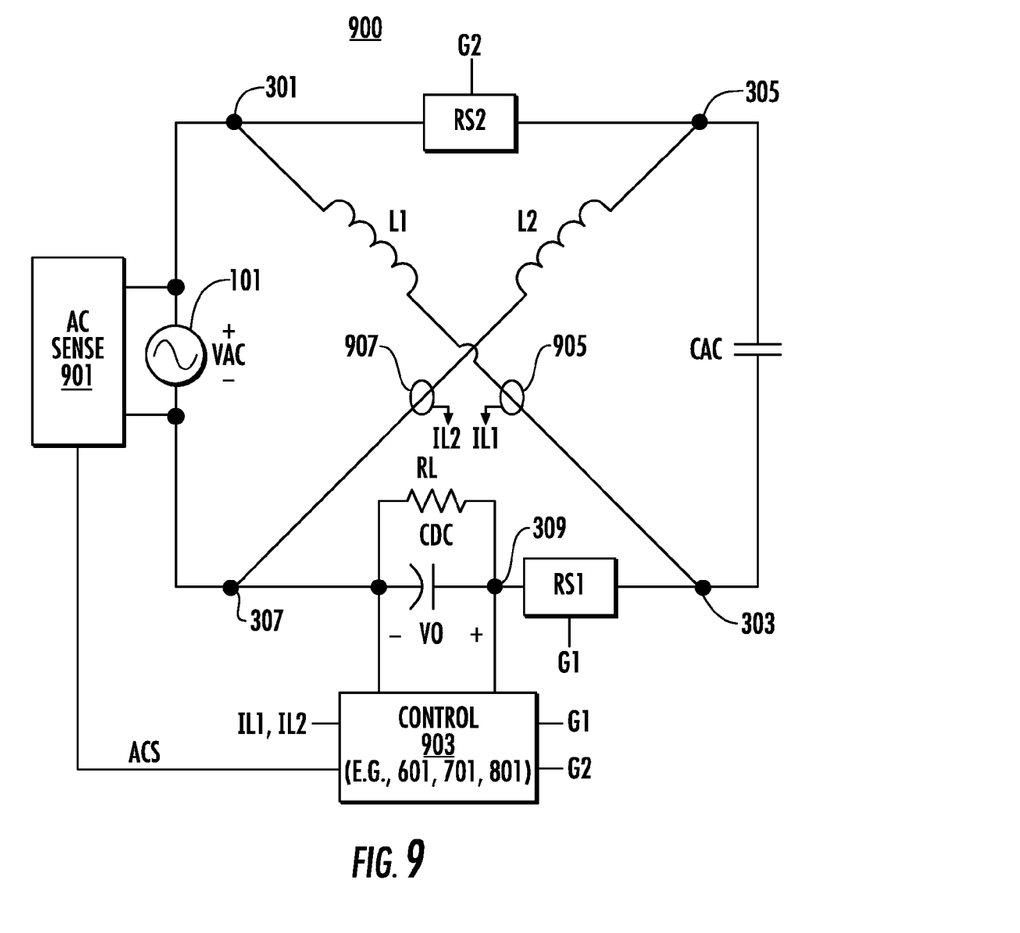
FIG. 9 is a schematic and block diagram of a Z-source converter illustrating that the same or similar control schemes may be applied to both the Z-source converter configuration and the quasi-Z-source converter configuration.

FIGS. 6, 7 and 8 illustrate various control schemes applied to a quasi-Z-source converter configuration. FIG. 9 is a schematic and block diagram of a Z-source converter 900 illustrating that the same or similar control schemes may be applied to the Z-source converter configuration. The Z-source converter 900 has substantially the same configuration as the Z-source converter 300, and includes the AC voltage source 101, the inductors L1 and L2, the capacitor CAC, the rectified switches RS1 and RS2 and the load devices RL and CDC coupled to the nodes 301, 303, 305, 307 and 309 in substantially the same manner. The rectified switches RS1 and RS2 are shown in the Z-source rectifier configuration in a similar manner as the converters 300 and 500. Each rectified switch RS1 and RS2 may be configured as a series coupled diode and electronic switch (e.g., MOSFET or the like) such as shown in FIG. 3 or as dual gate GaN devices with shorted gates as shown in FIG. 5A. The input voltage is VAC and the output voltage is VO applied across RL between nodes 309 and 307.

An AC sense block 901 is shown sensing VAC across the AC voltage source 101 and providing AC sense information ACS. ACS may be one signal (e.g., AS as shown in FIGS. 6 and 8) or multiple signals (e.g., ACP and ACN as shown in FIG. 7). A control block 903 is shown receiving ACS, sensing the output voltage V0 across the load resistor RL, and providing the G1 and G2 control signals to the rectified switches RS1 and RS2, respectively. The control block 903 is configured according to any of the control schemes described herein, such as any of the control networks 601, 701 or 801. The PWM control schemes may be according to any type of control scheme, such as, for example, fixed frequency PWM, variable frequency PWM, hysteretic control, fixed on-time, fixed off-time, etc. When implemented according to the control network 701 for current mode control, current sense devices 905 and 907 may be provided for sensing the current through the inductors L1 and L2, respectively, and providing the corresponding current sense signals IL1 and IL2 to the control block 903.

Figure 10:
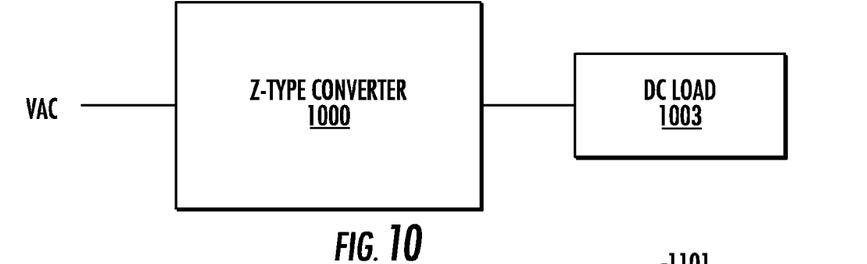
FIGS. 10-13 illustrate various electronic devices using a Z-type converter implemented according to any of the configurations described herein.
Figure 11:
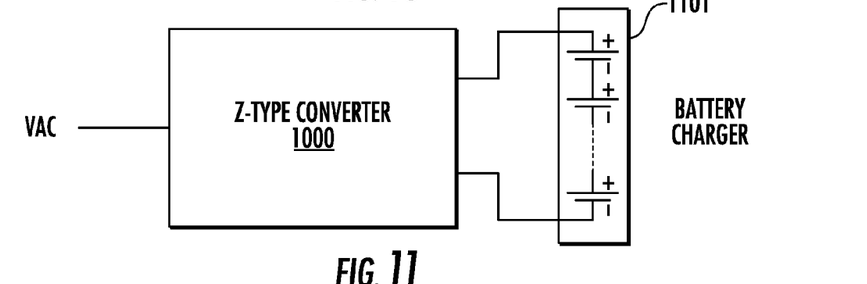
Figure 12:
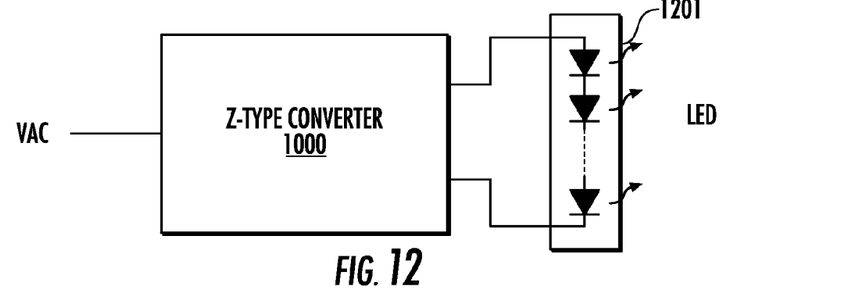
Figure 13:
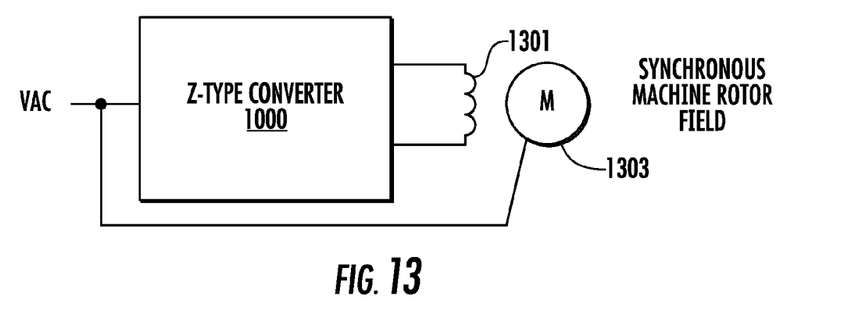

FIGS. 10-13 illustrate various electronic devices using a Z-type converter 1000 implemented according to any of the configurations described herein. The Z-type converter 1000 may be implemented as a Z-source converter or as a quasi-Z-source converter as described herein. As shown in FIG. 10, the converter 1000 receives VAC and drives any type of DC load 1003. As shown in FIG. 11, the converter 1000 receives VAC and charges a battery or battery bank 1101 including one or more rechargeable batteries. As shown in FIG. 12, the converter 1000 receives VAC and provides current to one or more light-emitting diodes (LEDs) 1201. As shown in FIG. 13, the converter 1000 receives VAC and provides current to a coil 1301 or the like to generate a magnetic field for an electric motor 1303 or the like.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. An AC to DC converter for converting an AC input voltage to a regulated DC output voltage, comprising:
   a Z-type converter receiving the AC input voltage and providing the DC output voltage, comprising:
      a first inductance coupled between first and second nodes and a second inductance coupled between third and fourth nodes;
      a first rectified switch coupled between said second and fourth nodes and a second rectified switch coupled between said first and third nodes;
      a capacitance coupled between said second and third nodes; and
      a load device which develops the DC output voltage, wherein said load device is coupled in series with one of said first inductance and said first rectified switch;
      wherein the AC input voltage is applied via said first and fourth nodes of said Z-type converter; and
   a control network which senses the AC input voltage and the DC output voltage and which develops a control signal for controlling said first and second rectified switches to regulate the DC output voltage.

2. The AC to DC converter of claim 1, wherein said control signal comprises a pulse control signal, wherein said control network activates said first rectified switch for a first portion of each cycle of the AC input voltage while toggling said second rectified switch using said pulse control signal, and which activates said second rectified switch for a second portion of each cycle of the AC input voltage while toggling said first rectified switch using said pulse control signal.

3. The AC to DC converter of claim 1, wherein said control signal comprises a pulse control signal, wherein said control network toggles said first rectified switch using said pulse control signal and toggles said second rectified switch using an inverted version of said pulse control signal during a first portion of each cycle of the AC input voltage, and said wherein control network toggles said first rectified switch using said inverted version of said pulse control signal and toggles said second rectified switch using said pulse control signal during a second portion of each cycle of the AC input voltage.

4. The AC to DC voltage converter of claim 1, wherein said Z-type converter comprises a Z-source converter in which said load device is coupled in series with said first rectified switch between second and fourth nodes.

5. The AC to DC voltage converter of claim 1, wherein said Z-type rectifier converter comprise a quasi-Z-source converter in which said load device is coupled in series with said first inductance between said first and second nodes.

6. The AC to DC voltage converter of claim 1, wherein said first and second rectified switches each comprise a series-coupled diode and MOSFET device.

7. The AC to DC voltage converter of claim 1, wherein said first and second rectified switches each comprise a dual gate GaN device with a shorted gate.

8. The AC to DC voltage converter of claim 1, wherein said control network comprises:
   an error amplifier network which develops an error signal based on the voltage level of the DC output voltage relative to a reference voltage level;
   a ramp generator which provides a ramp signal;
   a comparator which receives said error signal and said ramp signal and which provides a pulse control signal indicative thereof;
   an AC sense network which provides an AC sense signal indicative of the polarity of the AC input voltage; and
   a logic network which activates said first rectified switch and toggles activation of said second rectified switch according to said pulse control signal while the AC input voltage is a first polarity and which activates said second rectified switch and toggles activation of said first rectified switch according to said pulse control signal while the AC input voltage is a second polarity.

9. The AC to DC voltage converter of claim 1, wherein said control network comprises:
   an error amplifier network which develops an error signal based on the voltage level of the DC output voltage relative to a reference voltage level;
   a ramp generator which provides a ramp signal;
   a comparator which receives said error signal and said ramp signal and which provides a pulse control signal indicative thereof;
   an AC sense network which provides an AC sense signal indicative of the polarity of the AC input voltage; and
   a logic network which toggles activation of said first rectified switch according to said pulse control signal and toggles activation of said second rectified switch according to an inverted version of said pulse control signal while the AC input voltage is a first polarity, and which toggles activation of said second rectified switch according to said pulse control signal and toggles activation of said first rectified switch according to an inverted version of said pulse control signal while the AC input voltage is a second polarity.

10. The AC to DC voltage converter of claim 1, wherein said control network comprises:
   an error amplifier network which develops an error signal based on the voltage level of the DC output voltage relative to a reference voltage level;
   an AC sense network which provides an AC sense signal indicative of the polarity of the AC input voltage;
   a first current sensor which senses current through said first inductance and which provides a first current sense signal;
   a second current sensor which senses current through said second inductance and which provides a second current sense signal;
   a first current regulator which controls said first rectified switch based on said error signal, said AC sense signal and said first current sense signal; and
   a second current regulator which controls said second rectified switch based on said error signal, said AC sense signal and said second current sense signal.

11. A method of converting an AC input voltage to a DC output voltage using a Z-type converter, the Z-type converter including a first inductance coupled between first and second nodes, a second inductance coupled between third and fourth nodes, and a capacitance coupled between the second and third nodes, said method comprising:
- providing a first rectified switch between the second and fourth nodes;
- providing a second rectified switch between the first and third nodes;
- coupling a load device which develops the DC output voltage in series with one of the first inductance and the first rectified switch;
- receiving the AC input voltage via the first and fourth nodes; and
- sensing the AC input voltage and the DC output voltage and developing a control signal for controlling the first and second rectified switches to regulate the DC output voltage.

12. The method of claim 11, wherein:
- said developing a control signal comprises developing a pulse control signal; and
- wherein said controlling the first and second rectified switches comprises activating the first rectified switch for a first portion of each cycle of the AC input voltage while toggling the second rectified switch using the pulse control signal, and activating the second rectified switch for a second portion of each cycle of the AC input voltage while toggling the first rectified switch using the pulse control signal.

13. The method of claim 11, wherein:
- said developing a control signal comprises developing a pulse control signal; and
- wherein said controlling the first and second rectified switches comprises toggling the first rectified switch using the pulse control signal and toggling the second rectified switch using an inverted version of the pulse control signal during a first portion of each cycle of the AC input voltage, and toggling the second rectified switch using the pulse control signal and toggling the first rectified switch using the inverted version of the pulse control signal during a second portion of each cycle of the AC input voltage.

14. The method of claim 11, wherein the Z-type converter comprises a Z-source converter, and wherein said coupling a load device comprises coupling the load device in series with the first rectified switch between the second and fourth nodes.

15. The method of claim 11, wherein the Z-type converter comprises a quasi-Z-source converter, and wherein said coupling a load device comprises coupling the load device in series with the first inductance between the first and second nodes.

16. The method of claim 11, wherein said providing a first rectified switch and said providing a second rectified switch each comprise coupling a diode in series with a MOSFET device.

17. The method of claim 11, wherein said providing a first rectified switch and said providing a second rectified switch each comprise providing a dual gate GaN device with a shorted gate.

18. The method of claim 11, wherein sensing the AC input voltage and the DC output voltage and developing a control signal for controlling the first and second rectified switches to regulate the DC output voltage comprises:
- developing an error signal based on the voltage level of the DC output voltage relative to a reference voltage level;
- providing an AC sense signal indicative of the polarity of the AC input voltage;
- sensing current through the first inductance and providing a first current sense signal;
- sensing current through the second inductance and providing a second current sense signal;
- controlling the first rectified switch based on the error signal, the AC sense signal and the first current sense signal; and
- controlling the second rectified switch based on the error signal, the AC sense signal and the second current sense signal.

19. An electronic device, comprising:
- a Z-type converter having first, second, third and fourth nodes, which is configured for receiving an AC input voltage via said first and fourth and for providing a DC output voltage via said second and third nodes, comprising:
  - a first inductance coupled between said first and second nodes and a second inductance coupled between said third and fourth nodes;
  - a first rectified switch coupled between said second and fourth nodes and a second rectified switch coupled between said first and third nodes;
  - a load device which develops the DC output voltage, wherein said load device is coupled in series with one of said first inductance and said first rectified switch; and
  - a controller which senses said AC input voltage and said DC output voltage and which develops a control signal for controlling said first and second rectified switches to regulate said DC output voltage; and
- a DC load coupled to second and third nodes for receiving said DC output voltage.

20. The electronic device of claim 19, wherein said DC load comprises at least one rechargeable battery.

21. The electronic device of claim 19, wherein said DC load comprises at least one light-emitting diode.

22. The electronic device of claim 19, wherein said DC load comprises a coil for generating a magnetic field for an electric motor.

* * * * *